United States Patent [19]

Jaszka et al.

[11] 4,259,149

[45] Mar. 31, 1981

[54] METHOD OF REDUCING WASTE STREAM POLLUTANTS BY THE CONTROL AND SEPARATION OF WASTE CONTAMINANTS FROM A MULTI-STAGE CELLULOSIC BLEACHING SEQUENCE

[75] Inventors: Daniel J. Jaszka, Tonawanda; Ralph J. Gall, Amherst; Garry R. Roseman, North Tonawanda, all of N.Y.

[73] Assignee: Hooker Chemicals & Plastics Corp., Niagara Falls, N.Y.

[21] Appl. No.: 79,274

[22] Filed: Sep. 27, 1979

Related U.S. Application Data

[63] Continuation of Ser. No. 902,470, May 3, 1978, abandoned, which is a continuation of Ser. No. 748,449, Dec. 8, 1976, abandoned, which is a continuation of Ser. No. 480,172, Jun. 17, 1974, abandoned.

[51] Int. Cl.$^3$ .............................................. D21C 11/00
[52] U.S. Cl. ...................................... 162/29; 162/60; 162/65; 162/89; 162/DIG. 8; 210/928
[58] Field of Search ............... 162/29, 30, 16, DIG. 8, 162/88, 89, 65; 210/37 R

[56] References Cited

U.S. PATENT DOCUMENTS

| | | | |
|---|---|---|---|
| 3,433,702 | 3/1969 | Jack et al. | 162/89 |
| 3,501,374 | 3/1970 | Jack et al. | 162/89 |
| 3,652,407 | 3/1972 | Paleos | 162/30 |
| 3,698,995 | 10/1972 | Rapson | 162/89 |
| 3,759,783 | 9/1973 | Samuelson et al. | 162/65 |

OTHER PUBLICATIONS

Rohm & Haas Bulletin, "Decolorization of Kraft Pulp Bleaching Effluents Using Amberlite XAD-8 Polymeric Absorbent", 8/71.
Gall et al., *Tappi*, V. 56, #11, 11/73, pp. 72–76.
ABIPC, vol. 44, #8443, 6/73.

*Primary Examiner*—William F. Smith
*Attorney, Agent, or Firm*—Peter F. Casella; William G. Gosz

[57] ABSTRACT

A method is provided for reducing waste stream pollutants by the control and separation of color bodies, COD, BOD and other organics from inorganic chloride pollutants in the aqueous waste effluent of a cellulosic pulp bleaching process containing a sequential chlorination stage ($D_c$) or mixture (D/C) stage followed by an extraction (E) or oxygen (O) stage, comprising, maintaining the conditions of the $D_c$ or D/C stage such that the pulp product therefrom is low in inorganic chloride and organically bound chlorides and the waste effluent therefrom is low in organic distribution as compared to the subsequent E or O stage waste effluent, passing said waste effluent through an activated bed, under conditions wherein color bodies, COD, BOD and other organics are selectively removed therefrom without significant effect upon the inorganic chloride content; maintaining conditions in the E or O stage such that the waste effluent therefrom is high in organics distribution but low in inorganic chloride distribution as compared to the $D_c$ or D/C stage waste effluent; and passing at least some of the E or O stage waste effluent, intermittently from the $D_c$ or D/C stage waste effluent, through the activated bed under conditions sufficient to elute the color bodies, COD, BOD and other organics therefrom.

8 Claims, No Drawings

METHOD OF REDUCING WASTE STREAM POLLUTANTS BY THE CONTROL AND SEPARATION OF WASTE CONTAMINANTS FROM A MULTI-STAGE CELLULOSIC BLEACHING SEQUENCE

This is a continuation of application Ser. No. 902,470 filed May 3, 1978, now abandoned which is a continuation of application Ser. No. 748,449 filed Dec. 8, 1976 now abandoned which is a continuation of application Ser. No. 480,172 filed June 17, 1974 now abandoned.

BACKGROUND OF THE INVENTION

Industrial waste stream effluents present problems of purification which are quite different from the problems of municipal sewage treatment. The waste stream from each industrial process type is unique to that process and requires specialized rectification. pH control of acidic or alkaline waste materials, while of ecological importance, may be readily achieved in industrial waste streams by direct chemical treatment. The removal, solubilization or passivation of specific contaminants however, presents a problem more difficult of solution, which ofttimes require a combination of physical, biochemical and chemical treatments. Especially trying are the problems of preventing color, Chemical Oxidation Demand (COD), Biological Oxidation Demand (BOD) and chloride contamination of the surface water into which pulp mill waste streams are discharged. Color contamination of surface water presents an especially visible aesthetic problem as well as an adverse effect upon aquatic vegetable and animal life caused by altered light penetration of the surface water.

The purification of pulp mill effluents pose a unique problem in waste water treatment because the effluents are less amenable to the conventional water treatment procedures known and applied today in municipal and industrial waste water purification. The pulp production process creates multiple effluents having intense coloration which is largely the result of extracted tannins, lignins and their derivatives being removed from the cellulosic pulp, by selected chemical treatment stages. Any change in the actual processing of pulp which provides an effluent containing fewer contaminants, though carrying with it a reduced requirement for effluent treatment before discharge of the waste to surface water, usually adversely affects the quality of the pulp product. This first line of attack, the actual chemical bleaching technique applied, is then, restrictive of change as it poses the combined problems of economics and effectiveness of the chemical treatment, as well as the achievement of the desired bleached product characteristics demanded by the pulp and paper industry and is critical in any active program of water pollution abatement.

In conventional multi-stage bleaching sequences wherein chlorination (C), sequential chlorination ($D_c$) or mixtures of chlorine and chlorine dioxide (D/C) are employed, the bulk of the contaminants include chlorides, lignins, tannins and their chlorinated and oxidized derivatives. By sequential chlorination ($D_c$) is meant treatment with chlorine dioxide followed directly by treatment with chlorine; by chlorination (C) is meant treatment with chlorine without chlorine dioxide, and by mixtures of chlorine and chlorine dioxide (D/O is meant that treatment with chlorine and chlorine dioxide is simultaneous. Each of these contaminants is diverse in its reaction to specific pollution control mechanisms and each may be detrimental to the operation or economics of treatment stages tailored to effect one or more of the others. For example, chlorides rapidly corrode and foul equipment so that the transporting of such chlorides, with the organic contaminant stream, decreases the life and increases the cost of each treatment to which the stream is subjected. Accordingly, although chemical and physical treatment of the color bodies in pulp mill effluents has been an effective technique for reducing the amount thereof, the economics of such systems have been heretofore exorbitant and impractical in modern-day technology so that such techniques have not generally been applied to pulp mill effluents in practice with few exceptions. The use of activated sludge facilities, aerated lagoons and trickling filters have been successfully employed to decrease the BOD organics to more than 80% effectiveness but only remove from between about 10 to 15% of the color in the waste water effluent from a pulp bleaching plant. Accordingly, between 85 and 90% of the colored material from bleaching plant will then pass through the biochemical degradation step into the surface water disposal.

Conventional bleach sequences employed as multistage bleaching processes for wood pulp typically involve the treatment of the cellulosic pulp with chlorine (C), sequential chlorination ($D_c$) or mixtures (D/C), followed by a caustic extraction (E) or oxygen (O) treatment stage. In practice, further chlorine dioxide, caustic extraction, oxygen or peroxide stages may be included within the total process. Two particularly effective multi-stage bleach processes are conventionally designated CEDED and $D_c$EDED the letters, respectively, representing (C) chlorine, ($D_c$) sequential chlorine dioxide/chlorine, (E) extraction and (D) chlorine dioxide treatment stages. Other effective multistage bleaching processes include D/CEDED, $D_c$ODED, D/CODED, $D_c$ED, D/CED, $D_c$OD, D/COD, $D_c$EP, D/CEP, $D_c$OP, D/COP, $D_c$EDEP, D/CEDEP, $D_c$ODEP, D/COEDP, $D_c$EDEDP, D/CEDEDP, $D_c$ODEDP and D/CODEDP, wherein (P) represents peroxide treatment. It is pointed out that further process steps such as washing, etc., are understood as being optionally implemented in the total bleaching system. The effluents of each of these stages contain varying amounts and concentrations of the aforedescribed contaminants and the total effluent contamination thereof has presented a particularly difficult disposal problem. Heretofore, waste effluent treatment from CE, CO, $D_c$E, $D_c$O, D/CE or D/CO sequence containing bleaching processes, has consisted merely of treating the bulk effluent therefrom with little or no thought given to modification of the bleaching process or separation of the polluting effluents themselves. Accordingly, chemical and physical processes have been heretofore both inadequate in result and economically and commercially inadequate.

SUMMARY OF THE INVENTION

A particularly intense problem in the treating of pulp mill waste effluents is that the combined contaminants thereof have so widely diverse effects upon operable treating methods as to preclude an economical system having high efficiency and low maintenance requirements. Highly corrosive inorganic chlorides, both acids and salts, severely limit the life expectancy of the apparatus utilized; while inorganic chloride salts together with organics such as color bodies; COD, BOD and organic acids load up and foul the equipment so that constant cleaning and maintenance are required. Further, the presence of all of the contaminants in a single stream require the averaging of anti-pollutant treatment in any one step thereby preventing the maximization of such treatment.

Applicants have discovered that in multi-stage processes for bleaching cellulosic pulp utilizing a sequential or mixed chlorine dioxide and chlorine treatment and a subsequent extraction or oxygen stage treatment, process modification can be made in such a manner as to control and provide substantial separation of the contaminants in each stream, which separated contaminants can be economically and efficiently treated as to provide a relatively contaminant-free waste effluent at an economically inexpensive cost.

In accordance with applicant's invention, there is provided a method of reducing waste stream pollutants by the control and separation of color bodies, COD, BOD and other organics from inorganic chloride pollutants in the waste effluent of a cellulosic pulp bleaching process containing the sequence $D_cE$, $D_cO$, $D/CE$ or $D/CO$ comprising maintaining the conditions of the $D_c$ or $D/C$ stage such that the pulp product therefrom is low in inorganic chlorides and organically bound chlorides and the waste effluent therefore is low in organic distribution; passing said waste effluent to an activated bed under conditions wherein color bodies, COD, BOD and other organics are selectively removed from said effluent without significant effect upon the inorganic chloride content; maintaining conditions in a subsequent E or O stage such that the waste effluent therefrom is high in organics distribution but low in inorganic chloride distribution; and passing at least some of the E or O stage waste effluent, intermittently from the $D_c$ or $D/C$ stage waste effluent, through the activated bed under conditions sufficient to elute the color bodies, COD, BOD, and other organics therefrom. The intermittent E or O stage eluting stream may then be re-combined with the basic E or O stage waste effluent stream. The process is applicable to combinations of $D_c$, or $D/C$, E and O stage bleaching processes and essentially comprises the maintaining of specific conditions within these stages together with a combination of steps acting on these specific stages regardless of their position in the overall bleaching sequence. The result of the above system is the division of contaminants into two diverse effluent streams; a $D_c$ or $D/C$ stage waste effluent stream with a majority of the process inorganic chloride contamination therein and having an insignificant amount of colored bodies, COD, BOD and other organics therein; and an E or O stage waste effluent stream with an intense contamination in colored bodies, COD, BOD and other organic contaminants but containing an insignificant portion of inorganic chlorides therein. pH control of the $D_c$ or $D/C$ inorganic chloride containing stream can be readily affected to easily and economically produce an acceptable waste stream; while the intense organic containing stream may be recycled, concentrated, burned or otherwise disposed of without concern for the insignificant amount of chloride contaminants therein.

DETAILED DESCRIPTION OF THE INVENTION

In furtherance of the aforedescribed invention, applicants have found that the amount of inorganic chloride and organically bound chloride contaminants can be decreased in the pulp product of a $D_c$ or $D/C$ stage by operating such stage at low pH with a high ratio of chlorine dioxide to chlorine. At chlorine dioxide to chlorine ratios of from about 65:35 to about 95:5 and preferably about 75:25 to about 95:5 and at a pH of less than about 3.5, there is a substantial decrease in the amount of chloride contaminants in the $D_c$ or $D/C$ pulp product, while the amount of BOD, COD and other organic contaminants in the effluent therefrom is also significantly decreased. Further, it has unexpectedly been found that the comparative distribution of organic contaminants in the $D_c$ or $D/C$ effluent is also decreased, a significant portion of the distribution being carried over, with the pulp, to the subsequent stages. Still further, the toxicity and BOD of the $D_c$ or $D/C$ stage effluent together with the carry-over of toxicity and BOD with the pulp product is substantially decreased. Accordingly, then, effluent from such controlled $D_c$ or $D/C$ stage contains a relatively high distribution of inorganic chloride contaminant as compared to the E or O stage effluent and a relatively low distribution of color bodies, COD, BOD and other organics. Such contaminant controlled effluent may be clarified of suspended solids and then be conveniently passed through an activated bed which retains most of the color bodies and significant portions of the COD, BOD and other organics in the effluent. The activated bed should be such that the inorganic chlorides, except for small amount of the salts which may remain trapped in the bed, will pass through without substantial retention. Since the amount of organic contaminants being exposed to the activated bed is less than that of previous adsorption systems, the activated bed will have a longer loading life and, accordingly, be more economical to operate. The activated bed may be physical or chemical, ionic, adsorptive or absorptive in effect. Preferred activated beds include aromatic and aliphatic ion exchange, absorptive and adsorptive resin beds. Particularly preferred are the non-ionic macroporous resins, including crosslinked polystyrene resins, highly crosslinked hydrophylic acrylic ester copolymers, polyamide resins and phenol formaldehyde resins. Particularly appropriate resins are those as disclosed in U.S. Pat. No. 3,652,407 and *Macroreticular Polymeric Adsorbents*, I & EC Product Research & Development, Vol. 12, March, 1973. The $D_c$ or $D/C$ effluent stream which has passed through such activated bed will then contain most of the process generated inorganic chlorides, few organically bound chlorides, few color bodies, and a significantly reduced COD and BOD from that of the $D_c$ or $D/C$ effluent which came into the activated bed.

Subsequent oxygen or extraction stage treatment of the pulp, is operated under conditions so as to maximize the distribution of organics and minimize the distribution of inorganic chlorides in the waste effluent. The effluent from this subsequent extraction stage will then have a significantly reduced inorganic chloride distribution together with a high distribution of organic acids, COD, BOD and other organics. The effluent must be basic, at a pH from about 8 to about 13 preferably from about 10 to about 13 and most preferably about 11 to about 13.

As the multi-stage bleaching process operates, the material in the activated bed becomes loaded with the color bodies, COD, BOD and other organics that it retains from $D_c$ or $D/C$ effluent. Periodically, the $D_c$ or $D/C$ effluent flow therethrough is interrupted and the bed is regenerated by passing at least a portion of the basic E or O stage effluent therethrough. A flushing of the system using oxygen or extraction stage effluent elutes the color bodies, COD, BOD and other organics from the bed material and it concentrates them in the extraction or oxygen stage effluent. Thus, the result is two separate streams of effluent, one containing the majority of the process generated inorganic chloride ion, the other containing the majority of BOD, color bodies, COD and other organics. The inorganic chloride containing stream can be readily neutralized and discarded. Alternately, the inorganic chloride containing stream may be stripped before or after entering the activated bed to remove volatile low molecular weight contaminants, preferably by evaporation. The BOD, COD, color bodies and other organics containing stream can be recycled to a recovery furnace where they may be burned, recovering heat and caustic values. A particular advantage to this process is that very few chloride ions are present in the COD, BOD, color bodies and other organics containing stream thereby significantly reducing the corrosion and other adverse affects to the incinerator and other in-line equipment. Another advantage of this process is, it significantly reduces or eliminates secondary, on-site or regional treatment.

The following examples are presented to further delineate the aforedescribed invention and are not meant to be a limitation thereof.

EXAMPLE 1—Conventional Chlorination

A sample of Western Softwood Kraft pulp having a permanganate number of 20.7, viscosity of 27.6 centipoises and an unbleached brightness of 26%, was subjected to a commercial $CE_1D_1E_2D_2$ bleaching sequence in accordance with the conditions of Table 1.

TABLE 1

| Stage | Chemical Addition % based on pulp weight (oven-dried) | Time Min. | Temp. (°F.) | Pulp Consistency % |
|---|---|---|---|---|
| (C) chlorine | 6.63 | 45 | 77 | 3 |
| ($E_1$) Extraction | 3.0 | 60 | 158 | 10 |
| ($D_1$) chlorine dioxide | 0.95 | 180 | 158 | 3 |
| ($E_2$) Extraction | 0.6 | 60 | 158 | 10 |
| ($D_2$) chlorine dioxide | 0.41 | 180 | 158 | 3 |

The final brightness and viscosity of the pulp product were measured and found to be 88.5% and 15.0 cps respectively. The waste effluent from each stage was clarified of suspended solids, by filtration, analyzed and found to have organic and chloride content as shown in Table 2.

TABLE 2

| | (Kilograms/metric ton) | | | | | |
|---|---|---|---|---|---|---|
| | Stage | | | | | |
| | (C) | ($E_1$) | ($D_1$) | ($E_2$) | ($D_2$) | Total |
| Color | 42.4 | 268 | 7.3 | 6.1 | 1.4 | 325.2 |
| Chlorides (as NaCl) | 93.7 | 15.6 | 7.7 | 0.5 | 3.5 | 121.0 |
| COD | 20.3 | 45.5 | 6.1 | 3.8 | 1.4 | 77.1 |
| BOD | 6.0 | 3.7 | 1.4 | 1.0 | 0.3 | 12.4 |

EXAMPLE 2—Conventional Sequential Chlorination

A sample of Western Softwood Kraft pulp of the same physicals of Example 1, was subjected to a commercial $D_cE_1D_1E_2D_2$ bleaching sequence in accordance with the conditions of Table 3.

TABLE 3

| Stage | Chemical Addition % based on pulp weight (oven-dried) | Time Min. | Temp. (°F.) | Pulp Consistency % |
|---|---|---|---|---|
| ($D_c$) chlorine: chlorine dioxide sequential (50:50) | 6.0* | 30 | 80 | 3 |
| ($E_1$) Extraction | 2.4 | 60 | 160 | 10 |
| ($D_1$) chlorine dioxide | 0.9 | 180 | 160 | 3 |
| ($E_2$) Extraction | 0.5 | 60 | 160 | 10 |
| ($D_2$) chlorine dioxide | 0.9 | 180 | 160 | 3 |

*equivalent chlorine addition

The final brightness and viscosity of the pulp product were measured and found to be 88.7% and 18.3 cps respectively. The waste effluent from each stage was clarified of suspended solids, by filtration, analyzed and found to have organic and chloride content as shown in Table 4.

TABLE 4

| | (Kilograms/metric ton) | | | | | |
|---|---|---|---|---|---|---|
| | Stage | | | | | |
| | ($D_c$) | ($E_1$) | ($D_1$) | ($E_2$) | ($D_2$) | Total |
| Color | 42.0 | 171.4 | 7.0 | 6.0 | 1.2 | 227.6 |
| Chlorides (as NaCl) | 50.1 | 9.0 | 7.6 | 0.4 | 3.5 | 70.6 |
| COD | 18.5 | 37.2 | 6.0 | 3.9 | 1.4 | 67.0 |
| BOD | 5.0 | 4.7 | 1.0 | 0.7 | 0.3 | 11.7 |

EXAMPLE 3

A sample of Western Softwood Kraft pulp having a permanganate number of 20.7, viscosity of 27.6 centipoises and brightness of 26% was subjected to a $D_cE_1D_1E_2D_2$ bleach sequence in accordance with the conditions of Table 5.

TABLE 5

| Stage | Chemical Addition % based on pulp weight (oven-dried) | Time Min. | Temp. (°F.) | Pulp Consistency % |
|---|---|---|---|---|
| ($D_c$) chlorine dioxide chlorine sequential (75:25) | 6.0* | 30 | 86 | 10 |
| (E) Extraction | 2.0 | 60 | 158 | 10 |
| (D) chlorine dioxide | 0.93 | 180 | 158 | 3 |
| (E) Extraction | 0.5 | 60 | 158 | 10 |
| (D) chlorine dioxide | 0.4 | 180 | 158 | 3 |

*Total equivalent chlorine addition

The final brightness and viscosity of the pulp product were measured and found to be 88.5% and 16.2 cps respectively. The waste effluent from each stage was clarified of suspended solids, by filtration, analyzed and found to have organic and chloride content as shown in Table 6.

TABLE 6

| | (Kilograms/metric ton) | | | | | |
|---|---|---|---|---|---|---|
| | Stage | | | | | |
| | ($D_c$) | ($E_1$) | ($D_1$) | ($E_2$) | ($D_2$) | Total |
| Color | 37.1 | 141 | 3.5 | 3.5 | 2.9 | 188 |
| Chloride (as NaCl) | 34.7 | 4.9 | 7.7 | 0.4 | 3.5 | 51.2 |

TABLE 6-continued

| | (Kilograms/metric ton) | | | | | |
|---|---|---|---|---|---|---|
| | Stage | | | | | |
| | ($D_c$) | ($E_1$) | ($D_1$) | ($E_2$) | ($D_2$) | Total |
| COD | 17.5 | 41.3 | 6.4 | 3.4 | 1.0 | 69.6 |
| BOD | 4 | 5.5 | 0.8 | 0.5 | 0.3 | 11.1 |

The $D_c$ waste effluent was passed through a one inch diameter laboratory column packed with a highly cross-linked, hydrophylic, macroporous, adsorbent, acrylic ester, copolymer resin at a flow rate of 10–12 bed volumes per hour. Analysis of the effluent stream from the $D_c$ flow at 30 bed volumes through the macroporous bed indicated an organic and chloride average content of:

| Color | 9.6 Kilogram/metric ton |
|---|---|
| Chloride (NaCl) | 33.9 Kilogram/metric ton |
| COD | 9.8 Kilogram/metric ton |
| BOD | 3.6 Kilogram/metric ton |

The chloride was readily neutralized with alkali. The flow of $D_c$ effluent through the resin bed was interrupted and a portion of the $E_1$ stage was passed therethrough until the resin was fully regenerated as indicated by a constant eluate COD content. The $E_1$ eluate stream was then combined with the base $E_1$ waste effluent stream and passed to a recovery system wherein the organics are incinerated, recovering caloric and caustic values.

Total pollutants found in the waste stream of this bleaching sequence are as follows:

| Color | 19.5 Kilogram/metric ton |
|---|---|
| Chloride (NaCl) | 45.5 Kilogram/metric ton |
| COD | 21.4 Kilogram/metric ton |
| BOD | 5.2 Kilogram/metric ton |

A comparision with the waste effluents of conventional systems show the following percent reductions of contaminants:

| | Conventional CEDED % | Conventional $D_c$EDED % |
|---|---|---|
| Color | 94 | 91 |
| Chloride (NaCl) | 62 | 36 |
| COD | 72 | 68 |
| BOD | 58 | 56 |

Further reduction of the waste stream pollutants may be readily attained by counter current washing of the $D_1E_2$ and $D_2$ stages which combines the respective waste stream therefrom into the $E_1$ and $D_c$ influent wash stream. Such reduction will have a total pollutant order of magnitude as follows:

| Color | 11.3 Kg/metric ton |
|---|---|
| Chloride (NaCl) | 44.9 Kg/metric ton |
| COD | 13.9 Kg/metric ton |
| BOD | 4.6 Kg/metric ton |

In a similar manner pulp may be subjected to a $D_cOD_1ED_2$ bleach sequence in accordance with the conditions of Table 7.

TABLE 7

| Stage | | Chemical Addition % based on pulp weight (oven-dried) | Time Min. | Temp. (°F.) | Pulp Consistency % |
|---|---|---|---|---|---|
| ($D_c$) | chlorine dioxide chlorine sequence 75:25 | 6.0 | 30 | 80 | 10 |
| (O) | oxidation $O_2$ (100 psi) NaOH | 1.5 1.5 | 30 | 260 | 35 |
| ($D_1$) | chlorine dioxide | 0.53 | 180 | 160 | 3 |
| (E) | Extraction | 0.5 | 60 | 160 | 10 |
| ($D_2$) | chlorine dioxide | 0.4 | 180 | 160 | 3 |

The final brightness and viscosity of the pulp product will be found to be approximately 88% and 14 cps respectively. After counter current washing, treatment of the $D_c$ effluent in an acrylic resin activated bed, and incineration of the oxidation stage waste effluent stream, total pollutants discharged will be of the order of magnitude:

| Color | 12 Kg./metric ton |
|---|---|
| Chlorides (NaCl) | 41.0 Kg./metric ton |
| COD | 15.0 Kg./metric ton |
| BOD | 5.0 Kg./metric ton |

EXAMPLES 4–9

Various samples of Western Softwood Kraft pulp, having a permanganate number of 20.7, viscosity of 27.6 centipoises and brightness of 26% were subjected to a $D_cE_1D_1E_2D_2$ bleaching and subsequent waste effluent treatment sequence in accordance with the conditions and process of Example 3, with the exception that the material in the activated bed was varied. The organics and chloride content of the untreated effluent was as shown in Table 6. Analysis of the waste effluent from the $D_c$ flow through activated beds comprised of varying materials, indicated organic content as shown in Table 8.

TABLE 8

| | (Kilograms/metric ton) | | | | | |
|---|---|---|---|---|---|---|
| | Bed Material | | | | | |
| | Example 4 Polystyrene | Example 5 Acrylic Resin* | Example 6 Phenol Formaldehyde Resin | Example 7 Polystyrene/divinyl Benzene, Quaternary ammonium Functionality, Ion Exchange | Example 8 Phenol-Formaldehyde, Amine Functionality, Ion Exchange | Example 9 Polyamide Resin |
| Color | 18.6 | 9.65 | 15.9 | 3.71 | 15.6 | 15.2 |
| COD | 11.7 | 9.3 | 11.2 | 9.45 | — | 11.4 |

TABLE 8-continued

| | | | (Kilograms/metric ton) | | | |
|---|---|---|---|---|---|---|
| | | | Bed Material | | | |
| | Example 4 Polystyrene | Example 5 Acrylic Resin* | Example 6 Phenol Formaldehyde Resin | Example 7 Polystyrene/divinyl Benzene, Quaternary ammonium Functionality, Ion Exchange | Example 8 Phenol-Formaldehyde, Amine Functionality, Ion Exchange | Example 9 Polyamide Resin |
| BOD | — | — | — | 3.72 | — | — |

*Varies from resin of Example 3 by pore diameter

EXAMPLE 10

A sample of Western Softwood Kraft pulp, having a permanganate number of 20.7, viscosity of 27.6 centipoises and unbleached brightness of 26.9 was subjected to a D/C $E_1D_1E_2D_2$ bleaching sequence in accordance with the conditions of Table 9.

TABLE 9

| Stage | | Chemical Addition % based on pulp weight (oven-dried) | Time (Min.) | Temp. (°F.) | Pulp Consistency % |
|---|---|---|---|---|---|
| (D/C) | chlorine dioxide/chlorine mixture 75:25 | 6.25* | 30 | 90 | 10 |
| ($E_1$) | Extraction | 2.0 | 60 | 160 | 10 |
| ($D_1$) | Chlorine dioxide | 0.93 | 180 | 160 | 3 |
| ($E_2$) | Extraction | 0.5 | 60 | 160 | 10 |
| ($D_2$) | Chlorine dioxide | 0.4 | 180 | 160 | 3 |

*Equivalent chlorine addition

The final brightness and viscosity of the pulp product were measured and found to be 85.0% and 14.9 cps respectively. The effluent from each stage was clarified of suspended solids by filtration, analyzed and found to have organic and chloride content as shown in Table 10.

TABLE 10

| | (Kg/metric ton) | | | | | |
|---|---|---|---|---|---|---|
| | Stage | | | | | |
| | (D/C) | ($E_1$) | ($D_1$) | ($E_2$) | ($D_2$) | Total |
| Color | 23.8 | 156.6 | 4.0 | 3.6 | 3.0 | 191.0 |
| Chlorides (NaCl) | 35.3 | 4.8 | 8.0 | 0.4 | 3.5 | 52.0 |
| COD | 14.6 | 45.0 | 7.2 | 4.0 | 1.5 | 72.3 |
| BOD | 3.9 | 6.1 | 0.9 | 0.6 | 0.3 | 11.8 |

The effluents were treated using the method and materials of Example 3. Analysis of the D/C eluate stream for organic and chloride content showed:

| Color | 6.5 Kg/metric ton |
|---|---|
| Chloride (NaCl) | 34.5 Kg/metric ton |
| COD | 9.5 Kg/metric ton |
| BOD | 3.6 Kg/metric ton |

Total pollutant analysis of the waste stream of the bleaching sequence was:

| Color | 17.1 Kg/metric ton |
|---|---|
| Chloride (NaCl) | 46.4 Kg/metric ton |
| COD | 22.2 Kg/metric ton |
| BOD | 5.4 Kg/metric ton |

Further reduction of the waste stream pollutants may be readily attained by counter current washing of the $D_1$, $E_2$ and $D_2$ waste streams which combines the respective waste stream therefrom into the $E_1$ and $D_c$ influent wash stream.

EXAMPLE 11

The ($E_1$) effluent of Example 1 was combined with sufficient (C) effluent of the same example to maintain a pH of less than about 3.0. Such pH controlled effluent was then passed through a one inch diameter laboratory column packed with the resin of Example 3. Analysis of the effluent from the macroporous bed indicated an organic content of:

| Color | 28 Kg/metric ton |
|---|---|
| COD | 20.5 Kg/metric ton |
| BOD | 4 Kg/metric ton |

Total pollutants found in the waste stream of this process are as follows:

| Color | 73.3 Kg/metric ton |
|---|---|
| Chlorides (NaCl) | 121 Kg/metric ton |
| COD | 46.4 Kg/metric ton |
| BOD | 8.5 Kg/metric ton |

EXAMPLE 12

The ($E_1$) effluent of Example 1 was passed through a one inch diameter laboratory column packed with the resin of Example 6. Analysis of the effluent from the ion exchange bed indicated an organic and chloride content of:

| Color | 13.4 Kg/metric ton |
|---|---|
| Chlorides (NaCl) | 0.8 Kg/metric ton |
| COD | 4.6 Kg/metric ton |
| BOD | 2.2 Kg/metric ton |

Total pollutant found in the waste stream of the process are as follows:

| Color | 70.6 Kg/metric ton |
|---|---|
| Chlorides (NaCl) | 120.2 Kg/metric ton |
| COD | 36.2 Kg/metric ton |
| BOD | 7.8 Kg/metric ton |

We claim:

1. A method for reducing the waste stream pollutants from the aqueous waste effluent of a multi-stage cellulosic pulp bleaching process wherein the first stage consists essentially of $D_c$ or D/C treatment, and the second stage consists essentially of E or O treatment, said method comprising the steps of:
   (a) maintaining the ratio of $ClO_2:Cl_2$ in the first stage within a range of from about 65:35 to about 95:5 and the pH at less than about 3.5 to decrease the color, COD and BOD contaminants in the first stage effluent;
   (b) maintaining the pH of the second stage effluent at from about 8 to about 13 to decrease the inorganic chlorides in the second stage effluent;
   (c) passing said first stage effluent through an activated resin bed to remove color, COD and BOD contaminants, said activated resin being selected from the group consisting of aromatic and aliphatic ion exchange resins, absorptive resins, highly crosslinked hydrophylic acrylic resins, phenol formaldehyde resins, and polyamide resins;
   (d) intermittently passing at least some of said second stage effluent through said activated bed to elute color, COD and BOD contaminants; and
   (e) treating said second stage effluent after elution to recover heat and caustic valves.

2. The process of claim 1 wherein said first and second stage sequence is $D_c$E.

3. The process of claim 1 wherein said first and second stage sequence is $D_c$O.

4. The process of claim 1 wherein said first and second stage sequence is D/CE.

5. The process of claim 1 wherein said first and second stage sequence is D/CO.

6. The process of claim 1 wherein the bleaching process comprises a multi-stage bleaching sequence selected from the group consisting of $D_c$EDED, D/CEDED, $D_c$ODED, D/CODED, $D_c$ED, D/CED, $D_c$OD, D/COD, $D_c$EP, D/CEP, $D_c$OP, D/COP, $D_c$EDEP, D/CEDEP, $D_c$ODEP, D/CODEP, $D_c$EDEDP, D/CEDEDP, $D_c$ODEDP and D/CODEDP.

7. The process of claim 1 wherein stages subsequent to the $D_c$, D/C, E and O stage are counter-currently washed, concentrating waste contaminants in at least one of the $D_c$, D/C, E and O stage waste effluents.

8. The process of claim 1 wherein the ratio of $ClO_2:Cl_2$ in the first stage is in the range of from about 75:25 to 95:5 and the pH of the second stage effluent is from about 11 to about 13.

* * * * *